(12) United States Patent
Devenish et al.

(10) Patent No.: US 10,031,534 B1
(45) Date of Patent: Jul. 24, 2018

(54) PROVIDING SET POINT COMPARISON

(71) Applicant: OPOWER, INC., Arlington, VA (US)

(72) Inventors: Ryan Devenish, San Francisco, CA (US); Daniel McCool, San Francisco, CA (US); Thomas E. Darci, Oakland, CA (US); Ralph Niewmierzycki, Belmont, CA (US); Mari Miyachi, San Francisco, CA (US)

(73) Assignee: OPOWER, INC., Arlington, VA (US)

( * ) Notice: Subject to any disclaimer, the term of this patent is extended or adjusted under 35 U.S.C. 154(b) by 930 days.

(21) Appl. No.: 14/300,792

(22) Filed: Jun. 10, 2014

Related U.S. Application Data

(60) Provisional application No. 61/937,240, filed on Feb. 7, 2014.

(51) Int. Cl.
| | |
|---|---|
| *G05D 23/00* | (2006.01) |
| *G05B 13/00* | (2006.01) |
| *G05B 19/00* | (2006.01) |
| *G05D 23/19* | (2006.01) |
| *G05B 15/00* | (2006.01) |

(52) U.S. Cl.
CPC ......... *G05D 23/1917* (2013.01); *G05B 13/00* (2013.01); *G05B 15/00* (2013.01); *G05D 23/00* (2013.01)

(58) Field of Classification Search
None
See application file for complete search history.

(56) References Cited

U.S. PATENT DOCUMENTS

| | | | |
|---|---|---|---|
| 4,334,275 A | 6/1982 | Levine | |
| 4,843,575 A | 6/1989 | Crane | |
| 5,513,519 A | 5/1996 | Cauger et al. | |
| 5,566,084 A | 10/1996 | Cmar | |
| 5,717,609 A | 2/1998 | Packa et al. | |
| 5,855,011 A | 12/1998 | Tatsuoka | |
| 5,873,251 A | 2/1999 | Iino | |
| 5,930,773 A | 7/1999 | Crooks et al. | |
| 5,948,303 A | 9/1999 | Larson | |
| 6,035,285 A | 3/2000 | Schlect et al. | |
| 6,088,688 A | 7/2000 | Crooks et al. | |
| 6,295,504 B1 | 9/2001 | Ye et al. | |

(Continued)

FOREIGN PATENT DOCUMENTS

| | | |
|---|---|---|
| AU | 2010315015 | 7/2014 |
| CA | 2779754 | 5/2011 |

(Continued)

OTHER PUBLICATIONS

International Search Report and Written Opinion for PCT Application No. PCT/US2015/038692, dated Sep. 24, 2015, 13 pages.

(Continued)

*Primary Examiner* — Ronald D Hartman, Jr.
(74) *Attorney, Agent, or Firm* — Cooper Legal Group, LLC

(57) ABSTRACT

A thermostat set point insight providing method and system that receives thermostat set point information for a reference population for a user, receives at least one thermostat setting for the user, identifies the set point insight for the user based on the thermostat set point information for the reference population and the at least one thermostat setting for the user, and provides the set point insight to the user.

20 Claims, 11 Drawing Sheets

(56) References Cited

U.S. PATENT DOCUMENTS

| | | | |
|---|---|---|---|
| 6,327,605 B2 | 12/2001 | Arakawa et al. |
| 6,701,298 B1 | 3/2004 | Jutsen |
| 6,732,055 B2 | 5/2004 | Bagepalli et al. |
| 6,778,945 B2 | 8/2004 | Chassin et al. |
| 6,785,620 B2 | 8/2004 | Kishlock et al. |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1 | 11/2006 | Hoffberg et al. |
| 7,142,949 B2 | 11/2006 | Brewster et al. |
| 7,149,727 B1 | 12/2006 | Nicholls et al. |
| 7,200,468 B2 | 4/2007 | Ruhnke et al. |
| 7,243,044 B2 | 7/2007 | McCalla |
| 7,333,880 B2 | 2/2008 | Brewster et al. |
| 7,356,548 B1 | 4/2008 | Culp et al. |
| 7,444,251 B2 | 10/2008 | Nikovski et al. |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| 7,991,513 B2 | 8/2011 | Pitt |
| 8,065,098 B2 | 11/2011 | Gautam |
| 8,166,047 B1 | 4/2012 | Cohen et al. |
| 8,180,591 B2 | 5/2012 | Yuen et al. |
| 8,239,178 B2 | 8/2012 | Gray et al. |
| 8,260,468 B2 | 9/2012 | Ippolito et al. |
| 8,275,635 B2 | 9/2012 | Stivoric et al. |
| 8,280,536 B1 | 10/2012 | Fadell et al. |
| 8,348,840 B2 | 1/2013 | Heit et al. |
| 8,375,118 B2 | 2/2013 | Hao et al. |
| 8,417,061 B2 | 4/2013 | Kennedy et al. |
| 8,478,447 B2 | 7/2013 | Fadell et al. |
| 8,489,245 B2 | 7/2013 | Carrel et al. |
| 8,583,288 B1 | 11/2013 | Rossi et al. |
| 8,630,741 B1 | 1/2014 | Matsuoka et al. |
| 8,660,813 B2 | 2/2014 | Curtis et al. |
| 8,690,751 B2 | 4/2014 | Auphan |
| 8,751,432 B2 | 6/2014 | Berg-Sonne et al. |
| 8,805,000 B2 | 8/2014 | Derby et al. |
| 9,031,703 B2 | 5/2015 | Nakamura et al. |
| 2002/0065581 A1 | 5/2002 | Fasca |
| 2002/0178047 A1 | 11/2002 | Or et al. |
| 2002/0198629 A1 | 12/2002 | Ellis |
| 2003/0011486 A1 | 1/2003 | Ying |
| 2003/0018517 A1 | 1/2003 | Dull et al. |
| 2003/0023467 A1 | 1/2003 | Moldovan |
| 2003/0216971 A1 | 11/2003 | Sick et al. |
| 2004/0024717 A1 | 2/2004 | Sneeringer |
| 2004/0111410 A1 | 6/2004 | Burgoon et al. |
| 2004/0140908 A1 | 7/2004 | Gladwin et al. |
| 2005/0257540 A1 | 11/2005 | Choi et al. |
| 2006/0089851 A1 | 4/2006 | Silby et al. |
| 2006/0103549 A1 | 5/2006 | Hunt et al. |
| 2007/0061735 A1 | 3/2007 | Hoffberg et al. |
| 2007/0203860 A1 | 8/2007 | Golden et al. |
| 2007/0213992 A1 | 9/2007 | Anderson et al. |
| 2007/0255457 A1 | 11/2007 | Whitcomb et al. |
| 2007/0260405 A1 | 11/2007 | McConnell et al. |
| 2008/0027885 A1 | 1/2008 | Van Putten et al. |
| 2008/0167535 A1 | 7/2008 | Stivoric et al. |
| 2008/0195561 A1 | 8/2008 | Herzig |
| 2008/0281473 A1 | 11/2008 | Pitt |
| 2008/0281763 A1 | 11/2008 | Yliniemi |
| 2008/0306985 A1 | 12/2008 | Murray et al. |
| 2009/0106202 A1 | 4/2009 | Mizrahi |
| 2009/0204267 A1 | 8/2009 | Sustaeta et al. |
| 2009/0326726 A1 | 12/2009 | Ippolito et al. |
| 2010/0025483 A1 | 2/2010 | Hoeynck et al. |
| 2010/0076835 A1 | 3/2010 | Silverman |
| 2010/0082174 A1 | 4/2010 | Weaver |
| 2010/0099954 A1 | 4/2010 | Dickinson et al. |
| 2010/0138363 A1 | 6/2010 | Batterberry et al. |
| 2010/0156665 A1 | 6/2010 | Krzyzanowski et al. |
| 2010/0179704 A1 | 7/2010 | Ozog |
| 2010/0198713 A1 | 8/2010 | Forbes, Jr. et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0217651 A1 | 8/2010 | Crabtree et al. |
| 2010/0232671 A1 | 9/2010 | Dam et al. |
| 2010/0286937 A1 | 11/2010 | Hedley et al. |
| 2010/0289643 A1 | 11/2010 | Trundle et al. |
| 2010/0324962 A1 | 12/2010 | Nesler et al. |
| 2010/0332373 A1 | 12/2010 | Crabtree et al. |
| 2011/0022429 A1 | 1/2011 | Yates et al. |
| 2011/0023045 A1 | 1/2011 | Yates et al. |
| 2011/0040666 A1 | 2/2011 | Crabtree et al. |
| 2011/0061014 A1 | 3/2011 | Frader-Thompson et al. |
| 2011/0063126 A1 | 3/2011 | Kennedy et al. |
| 2011/0106316 A1 | 5/2011 | Drew et al. |
| 2011/0106328 A1 | 5/2011 | Zhou et al. |
| 2011/0106471 A1 | 5/2011 | Curtis et al. |
| 2011/0153102 A1 | 6/2011 | Tyagi et al. |
| 2011/0178842 A1 | 7/2011 | Rane et al. |
| 2011/0178937 A1 | 7/2011 | Bowman |
| 2011/0205245 A1 | 8/2011 | Kennedy et al. |
| 2011/0231320 A1 | 9/2011 | Irving |
| 2011/0251730 A1 | 10/2011 | Pitt |
| 2011/0251807 A1 | 10/2011 | Rada et al. |
| 2011/0282505 A1 | 11/2011 | Tomita et al. |
| 2012/0036250 A1 | 2/2012 | Vaswani et al. |
| 2012/0053740 A1 | 3/2012 | Venkatakrishnan et al. |
| 2012/0066168 A1 | 3/2012 | Fadell et al. |
| 2012/0078417 A1 | 3/2012 | Connell, II et al. |
| 2012/0084063 A1 | 4/2012 | Drees et al. |
| 2012/0215369 A1 | 8/2012 | Desai et al. |
| 2012/0216123 A1 | 8/2012 | Shklovskii et al. |
| 2012/0259678 A1 | 10/2012 | Overturf et al. |
| 2012/0290230 A1 | 11/2012 | Berges Gonzalez et al. |
| 2012/0310708 A1 | 12/2012 | Curtis et al. |
| 2013/0060531 A1 | 3/2013 | Burke et al. |
| 2013/0060720 A1 | 3/2013 | Burke |
| 2013/0173064 A1 | 7/2013 | Fadell et al. |
| 2013/0211783 A1* | 8/2013 | Fisher ............... G06F 11/30 702/182 |
| 2013/0253709 A1 | 9/2013 | Renggli et al. |
| 2013/0261799 A1 | 10/2013 | Kuhlmann et al. |
| 2013/0262040 A1 | 10/2013 | Buckley |
| 2014/0006314 A1 | 1/2014 | Yu et al. |
| 2014/0019319 A1 | 1/2014 | Derby et al. |
| 2014/0074300 A1 | 3/2014 | Shilts et al. |
| 2014/0107850 A1 | 4/2014 | Curtis |
| 2014/0148706 A1 | 5/2014 | Van Treeck et al. |
| 2014/0163746 A1 | 6/2014 | Drew et al. |
| 2014/0207292 A1 | 7/2014 | Ramagem et al. |
| 2014/0337107 A1 | 11/2014 | Foster |
| 2015/0105918 A1* | 4/2015 | Lee ............... F24F 11/006 700/276 |
| 2015/0227846 A1 | 8/2015 | Mercer et al. |
| 2015/0267935 A1 | 9/2015 | Devenish et al. |
| 2015/0269664 A1 | 9/2015 | Davidson |
| 2015/0310019 A1 | 10/2015 | Royer et al. |
| 2015/0310463 A1 | 10/2015 | Turfboer et al. |
| 2015/0310465 A1 | 10/2015 | Chan et al. |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |

(56) References Cited

FOREIGN PATENT DOCUMENTS

| JP | 2013-020307 | 1/2013 |
|---|---|---|
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

International Preliminary Report on Patentability for PCT Application No. PCT/US2010/055621, dated May 15, 2012, 8 pages.
International Search Report and Written Opinion for PCT Application No. PCT/US2010/055621, dated Dec. 23, 2010, 9 pages.
International Search Report and Written Opinion for PCT Application No. PCT/US2012/036539, dated Jul. 6, 2012, 8 pages.
International Preliminary Report on Patentability for PCT Application No. PCT/US2012/036539, dated Nov. 21, 2013, 7 pages.
International Search Report and Written Opinion for PCT Application No. PCT/US2013/046126, dated Aug. 22, 2013, 9 pages.
International Preliminary Report on Patentability for PCT Application No. PCT/US2013/046126, dated Jan. 8, 2015, 8 pages.
International Search Report for PCT Application No. PCT/US2014/036901, dated Aug. 28, 2014, 3 pages.
Patent Examination Report No. 1 for Australian Patent Application No. 2010315015, dated Dec. 17, 2013, 3 pages.
Extended European Search Report for European Patent Application No. 12782569.3, dated Nov. 27, 2014, 7 pages.
Author Unknown, "An Inconvenient Truth," Jan. 9, 2008, 2 pages, available at http://web.archive.org/web/2008019005509/http://www.climatecrisis.net/takeaction/carbonca/.
Author Unknown, "Calculate Your Impact," Jul. 28, 2008, 4 pages, available at http://web.archive.org/web/20080728161614/http://green.yahoo.com/calculator/.
Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.
Author Unknown, "CoolClimate Calculator," May, 19, 2008, 15 pages, available at http://web.archive.org/web/20080519220643/bie.berkeley.edu/coolcalc/calculations.html.
Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.
Author Unknown, "More than just a thermostat.," http://www.ecobee.com/, 4 pages, Jul. 16, 2013.
Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.
Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.
Chen, Hanfeng, et al., "Testing for a Finite Mixture Model With Two Components," Journal of the Royal Statistical Society, Series B, vol. 66, No. 1, 26 pages, 2004.
De Prensa, Boletine, "TXU Energy Budget Alerts Give Consumers Control of Electricity Costs," TXU Energy, http://www.txu.com/es/about/press, 2 pages, May 23, 2012.
Deb, Partha, "Finite Mixture Models," Hunter College and the Graduate Center, CUNY NBER, FMM Slides, 42 pages, Jul. 2008.

D'Urso, M., et al., "A Simple Strategy for Life Signs Detection Via an X-Band Experimental Set-Up," Progress in Electromagnectics Research C, vol. 9, pp. 119-129 (2009).
Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.
Fels, Margaret F., "PRISM: An Introduction," Elsevier Sequoia, Energy and Buildings, vol. 9, pp. 5-18, 1986.
Fels, Margaret F., et al., Seasonality of Non-heating Consumption and Its effect on PRISM Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
Friedman, Jerome, et al., "Regularization Paths for Generalized Linear Models via Coordinate Descent," Journal of Statistical Sotfware, vol. 33, Iss. 1, pp. 1-22, Jan. 2010.
Goldberg, Miriam L., et al., "Refraction of PRISM Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." https://jawbone.com/up/, 7 pages, Jul. 15, 2013.
Leisch, Friedrich, "FlexMix: A General Framework for Finite Mixture Models and Latent Class Regression in R," Journal of Statistical Software, http://www.jstatsoft.org/, vol. 11 (8), pp. 1-18, Oct. 2004.
Liang, Jian, et al. "Load Signature Study-Part II: Disaggregation Framework, Simulation, and Applications," IEEE Transactions on Power Delivery, vol. 25, No. 2, pp. 561-569, Apr. 2010.
Liang, Jian, et al., "Load Signature Study-Part I: Basic Concept, Structure, and Methodology," IEEE Transactions on Power Delivery, vol. 25, No. 2, pp. 551-560, Apr. 2010.
Mint.com, "Budgets you'll actually stick to," Budgeting-Calculate and Categorize your spending, https://www.mint.com/how-it-works/budgeting/, 2 pages, Jul. 12, 2013.
Mint.com, "We're always on alert." Alerts for bills, fees & going over budget, http://www.mint.com/how-it-works/alerts/, 2 pages, Jul. 12, 2013.
Mori, Hiroyuki, "State-of-the-Art Overview on Data Mining in Power Systems," IEEE, pp. 33-37, 2006.
Muthen, Bengt, et al., Finite Mixture Modeling with Mixture Outcomes Using the EM Algorithm, Biometrics, vol. 55, pp. 463-469, Jun. 1999.
Nest, "The Learning Thermostat," http://www.nest.com/, 2 pages, Jul. 15, 2013.
Nike.com, "Nike + FuelBand. Tracks your all-day activity and helps you do more . . . ," http://www.nike.com/us/en.us/nikeplus-f..uelband, 7 pages, Jul. 15, 2013.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time

(56) References Cited

OTHER PUBLICATIONS series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
Wikipedia, "Mixture model," 10 pages, Oct. 7, 2012.

\* cited by examiner

PROVIDING SET POINT COMPARISON

CROSS-REFERENCE TO RELATED APPLICATION

This application claims priority to and the benefit of U.S. Provisional Patent Application No. 61/937,240, filed on Feb. 7, 2014, the disclosure of which is incorporated by reference herein in its entirety.

BACKGROUND

Field

The present disclosure relates generally to energy conservation and more specifically to providing thermostat set point comparisons.

Description of the Related Art

Heating and cooling usage is often a significant driver of energy use. These loads are dependent upon customer-defined heating and cooling set points, which determine the thresholds for heating, ventilation, and air conditioning (HVAC) system operation. Various efforts have been made to reduce energy use associated with heating and cooling usage.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Without data about normative behavior or guidance about best practices, individual thermostat users may use abstraction and intuition to determine the optimal set point temperatures for their thermostats. Individual thermostat users may determine their set point temperatures based on personal experience, perceived community values, physical comfort, and/or other factors. For example, an individual thermostat user may set his or her thermostat set point at 72 degrees during the evening because his or her parents did the same when he or she was a child.

Because energy conservation is a continuum, thermostat users can usually improve their conservation practices. However, thermostat users have no basis for comparing their behavior to the behavior of others. Although many people may be financially and/or morally motivated to conserve energy, they may have no way of determining a baseline or high mark for consumption. Accordingly, community behavior with respect to energy conservation may become stagnant.

According to an embodiment, network connected thermostats (e.g., smart thermostats that are connected to smart thermostat software) may ameliorate this problem by providing data (e.g., historical data or real time data) which may be used for peer comparisons. An embodiment may present thermostat users with information about how other thermostat users use their thermostats. The information may include comparative data configured to educate thermostat users about social norms, create bounds and context to their behavior, and encourage increased energy conservation. Providing these normative comparisons may drive energy conservation. As a result, an embodiment may promote better energy consumption practices by thermostat users.

Figure 1:
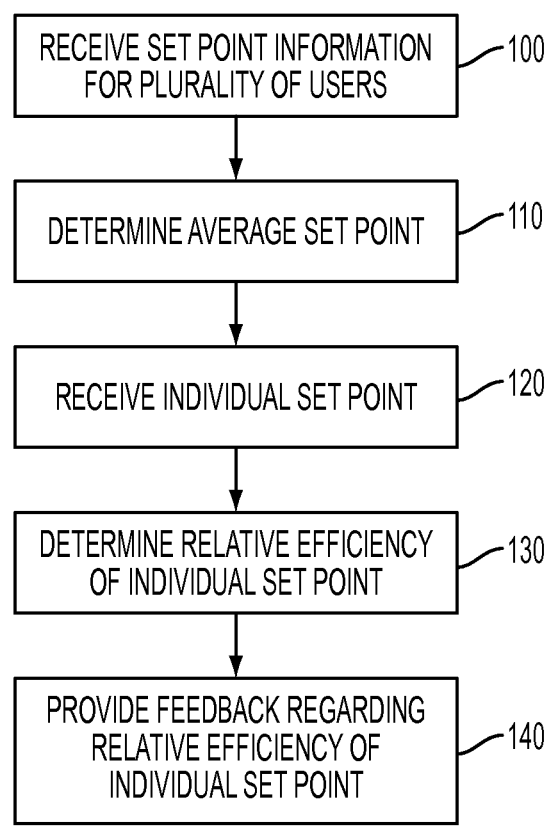
FIG. 1 is a flow diagram illustrating a process for providing feedback regarding the relative efficiency of an individual thermostat set point, according to an embodiment.

FIG. 1 is a flow diagram illustrating a process for providing feedback regarding the relative efficiency of an individual thermostat set point, according to an embodiment. In block 100, thermostat set point information for a plurality of thermostat users is received. The thermostat set point information may be received from the users' thermostats, provided by the thermostat users, or provided by a utility serving the thermostat users. The thermostat set point information may also be retrieved from a database or provided by a third party such as a thermostat company. Alternatively, the information may be provided by a resource such as the Energy Information Administration (EIA), Independent Service Operators (ISOs), or Regional Transmission Organizations (RTOs). According to another embodiment, the thermostat set point information may be calculated/estimated based on energy consumption information for the thermostat users.

Next, in block 110, an average thermostat set point is determined for the plurality of thermostat users. The average thermostat set point may be determined for a specific time period (e.g., 7:00 p.m. to 7:29 p.m.), or it may be determined for a time of day (e.g., morning, noon, evening, or night) or for specific building occupancy status (e.g., "wake," "leave home," "return home," "go to sleep," etc.). Alternatively, according to another embodiment, the average thermostat set point may be determined using set point information that is deemed sufficiently current (e.g., set point information corresponding to thermostat set points in effect during the previous 10, 20, or 30 minutes).

In determining the average thermostat set point, all available thermostat set point information satisfying any recentness requirement and/or specific time period, time of day, or building occupancy status may be used. According to another embodiment, the average thermostat set point may be determined using only thermostat set point information for similar thermostat users. For example, thermostat set point may be determined using thermostat set point information thermostat users in one or more of a specific geographic area (e.g., zip code, neighborhood, city, state, region, etc.), climate zone, utility, rate plan, utility program, building characteristics (e.g., home or business, business type, size, number of bedrooms or bathrooms, age, etc.), energy usage characteristics (e.g., average electricity or other utility bill, energy efficiency characteristics, etc.), family characteristics (e.g., family size, demographic information, etc.), etc.

Next, in block 120, a thermostat set point for an individual thermostat user is received. The thermostat set point may be transmitted from the thermostat, or by a computer, smartphone, or mobile device that provides a graphical user interface for setting a thermostat set point. Alternatively, the thermostat set point may be received from a utility, thermostat manufacturer, or other third party. The thermostat set point also may be received in another manner.

Next, in block 130, the relative efficiency of the received thermostat set point for the individual thermostat user is determined. The relative efficiency determination may be made using the determined average thermostat set point. For example, the individual thermostat user's set point may be compared to the determined average thermostat set point to determine whether it is similarly efficient, comparatively more efficient, or comparatively less efficient. Determining the relative efficiency of the individual thermostat user's thermostat set point is described in more detail below.

Finally, in block 140, feedback regarding the relative efficiency of the individual thermostat user's set point is provided to the thermostat user. According to an embodiment, the feedback may be provided on the thermostat or on a graphical user interface on a computer, smartphone, or mobile device. Feedback may include the average set point, another thermostat set point value, or information that illustrates the relative difference between the average set point and the thermostat set point for the individual thermostat user. Providing feedback regarding the relative efficiency of the individual thermostat user's set point is described in more detail below.

Although various embodiments described herein refer to determining an average set point for the plurality of thermostat users or thermostats, other embodiments may involve determining a thermostat set point value for the plurality of thermostat users or thermostats. The thermostat value may be calculated using various formulas and measurements. The measurements may include an average set point, a median set point, a percentile, or another measure of thermostat set points.

Figure 2:
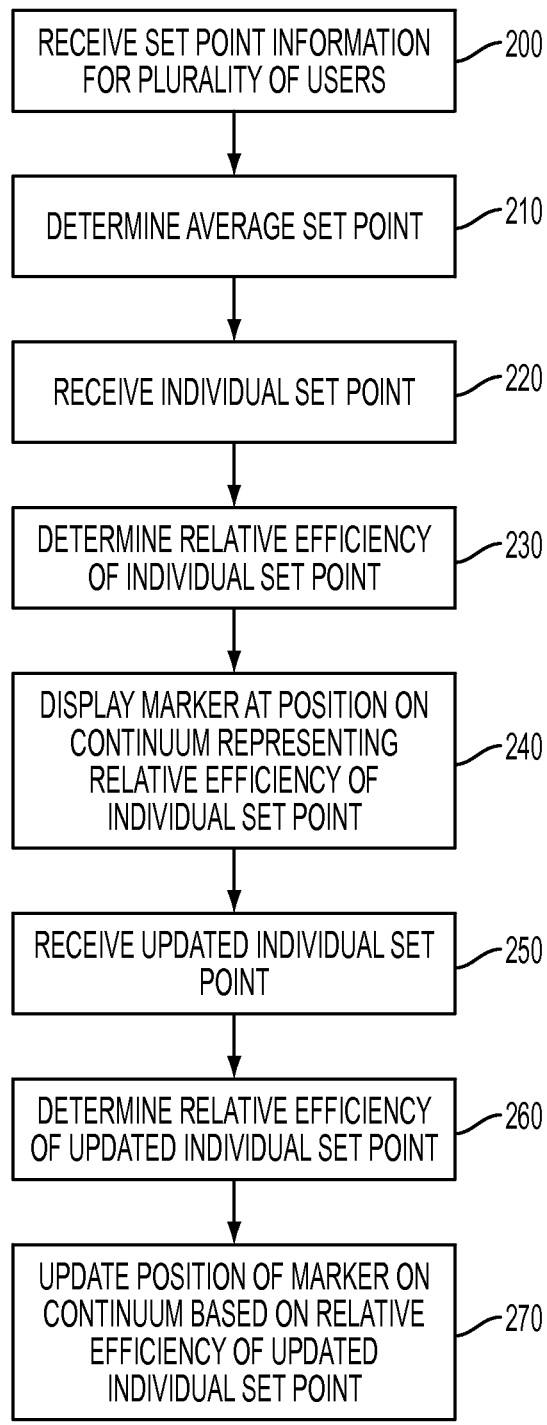
FIG. 2 is a flow diagram illustrating a process for providing a visual representation of the relative efficiency of an individual thermostat set point, according to an embodiment.

FIG. 2 is a flow diagram illustrating a process for providing a visual representation of the relative efficiency of an individual thermostat set point, according to an embodiment.

In block 200, thermostat set point information for a plurality of thermostat users is received. As discussed above, the thermostat set point information may be received from the users' thermostats, or provided by the thermostat users, a utility serving the thermostat users, a resource such as the EIA, ISOs, or RTOs, or from any other source.

Next, in block 210, an average thermostat set point is determined for the plurality of thermostat users. As discussed above, the average thermostat set point may be determined for a specific time period, time of day, or building occupancy status. Alternatively, according to another embodiment, the average thermostat set point may be determined using thermostat set point information that is deemed sufficiently current.

Next, in block 220, a thermostat set point for an individual thermostat user is received. The thermostat set point may be transmitted from the thermostat, or by a computer, smartphone, or mobile device that provides a graphical user interface for setting a thermostat set point. Alternatively, the thermostat set point may be received from a utility, thermostat manufacturer, or other third party. The thermostat set point also may be received in another manner.

Next, in block 230, the relative efficiency of the received thermostat set point for the individual thermostat user is determined. As discussed in greater detail below, the relative efficiency determination may be made using the determined average thermostat set point.

Next, in block 240, in a graphical user interface, a marker may be displayed at a position on a continuum representing the determined relative efficiency of the individual thermostat user's set point. According to an embodiment, the graphical user interface may be an interface for setting a thermostat set point that is displayed on a display of a thermostat, computer, smartphone, or mobile device. This is described in greater detail below.

Based on the feedback regarding the relative efficiency of the selected thermostat set point provided by the marker on the continuum or other factors, a thermostat user may choose to update the thermostat set point. In block 250, the updated individual thermostat set point is received.

Next, in block 260, the relative efficiency of the received updated set point for the individual thermostat user is determined, using the determined average thermostat set point for the plurality of users. According to another embodiment, updated thermostat set point information may also be received from some or all of the plurality of thermostat users, and an updated average thermostat set point may be determined. In this case, the updated average thermostat set point may be used in determining the relative efficiency of the received updated set point for the individual thermostat user.

Finally, in block 270, in the graphical user interface, the position of the marker on the continuum is updated to represent the determined relative efficiency of the updated thermostat set point for the individual user.

According to an embodiment, the system may use real time set point information for some or all network connected users, as well as information about the users' geographic locations. According to another embodiment, information may also be received about some or all of the following attributes: (1) home size, (2) HVAC system size/power, (3) HVAC system type, (4) thermodynamic properties and related factors, (5) outdoor temperature, (6) family demographics (e.g., age, number of individuals in house, etc.), (7) structural specifications of building (e.g., multilevel unit, apartment, single family home, etc.), (8) other building specifications (e.g., age of building, remodels, building materials, etc.), or (9) other factors.

Information about thermodynamic properties and related factors may include: (1) drift rate (i.e., how well a home maintains a particular temperature), (2) environment (e.g., wind, moisture, solar radiation, etc.), (3) building materials and design, (4) density of nearby building development, (5) surrounding natural landscapes (e.g., trees, hills, etc. that provide insulation and protection from the elements), or (6) other factors.

According to an embodiment, the information received about some or all of the attributes discussed above may be used to determine an average thermostat set point for a group of thermostat users having one or more shared or similar attributes. Separate average thermostat set points may be calculated for other groups of thermostat users having other shared attributes. In determining the relative efficiency of an individual thermostat user's set point, the thermostat set point may be compared to the average thermostat set point for one or more groups of thermostat users having one or more similar or shared attributes (e.g., home size, family demographics, etc.).

According to an alternative embodiment, an average thermostat set point for one or more groups of energy efficient neighbors or other energy efficient thermostat users having one or more similar or shared attributes may be determined. A "neighbor" may be a utility customer located near (e.g., within the same city, the neighborhood, the zip code, or within 5 miles) the thermostat user. An "energy efficient neighbor" may be a neighbor that uses less than a threshold amount of energy (e.g., less than 900 kWh per month) or is associated with a particular energy efficiency level (e.g., the utility customer uses less than 50% of all other utility customers located near the thermostat user or is more energy efficient than 75% of the thermostat user's neighbors). In determining the relative efficiency of an individual thermostat user's set point, the thermostat set point may be compared to the average thermostat set point for one or more groups of energy efficient neighbors or other energy efficient thermostat users having one or more similar or shared attributes (e.g., home size, family demographics, etc.).

According to an embodiment, real time comparative thermostat data may be presented to thermostat users on their thermostats, computers, smartphones, or mobile devices. Behavioral change may be promoted by segmenting and displaying the data on a continuum that places thermostat users in context with their peers and/or energy efficient peers. An embodiment may promote a behavioral understanding of temperature management as opposed to or in addition to a numbers-focused understanding of temperature management. The specific user interface and segmentation algorithms may vary.

The peer oriented approach is based on the notion that when energy conservation is viewed on an energy efficiency continuum, it is likely that the thermostat user can reduce his or her energy consumption. Placing thermostat users in real time context with their peers enables thermostat users to realize the scope of the energy efficiency continuum and where their behavior lies on that energy efficiency continuum. Behavioral comparison may encourage energy conservation because individual thermostat users may not want to be considered outliers or even average. Rather, thermostat users may seek to conform to, or exceed, their peers with regard to energy efficiency. According to an embodiment, thermostat users are offered the power to choose where they would like to be on the energy efficiency continuum.

An embodiment may use algorithms to segment real time thermostat set point data and display that data in a manner that encourages increased energy conservation. FIGS. 3A, 3B, 3C, and 3D illustrate a thermostat set point efficiency visualization 300 that displays the relative efficiency of an individual thermostat set point that may be displayed as part of a graphical user interface, according to an embodiment. A graphical user interface may use graphics that are tailored to produce emotional engagement and behavioral response by thermostat users.

Specifically, the thermostat user's set point may be displayed on the energy efficiency continuum 310 using a marker 360. As the thermostat user changes his or her thermostat set point, the marker 360 may move across the energy efficiency continuum 310 to reflect the changed set point. The marker 360 may be displayed as an ideogram, which changes as the user increases or decreases their thermostat set point, such that an unhappy face is displayed when the user selects a below-average-efficiency thermostat set point, a blank face is displayed when the user selects an average-efficiency thermostat set point, and a smiley face is displayed when the user selects an above-average-efficiency thermostat set point.

The face symbol is an emotional engagement tool. Faces are inherently human, and subtle facial cues are highly expressive. When the marker 360 moves to a particular segment 320, 330, 340 on the continuum 310, the marker 360 may change to communicate emotions that shame, encourage, or congratulate the thermostat user for selecting a particular thermostat set point.

Segment 320 on the energy efficiency continuum 310 may represent below-average-efficiency thermostat set points (e.g., cooling set points below 75 degrees). Segment 330 on the energy efficiency continuum may represent average-efficiency thermostat set points (e.g., cooling set points between 75 degrees and 80 degrees). Segment 340 on the energy efficiency continuum 310 may represent above-average-efficiency thermostat set points (e.g., cooling set points above 80 degrees).

Figure 3A:
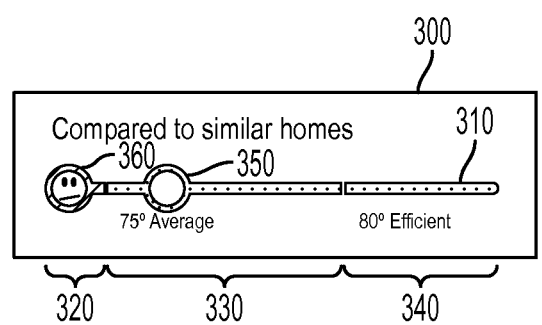
FIGS. 3A, 3B, 3C, and 3D illustrate a graphical user interface that provides a visual representation of the relative efficiency of an individual thermostat set point, according to an embodiment.
Figure 3B:
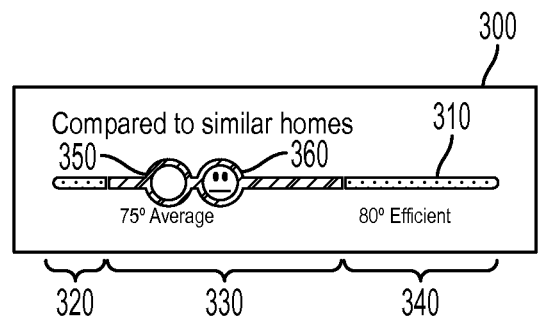
Figure 3C:
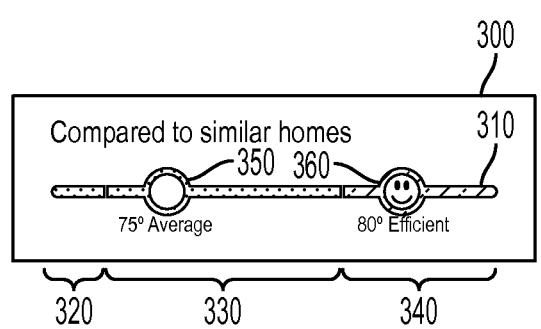
Figure 3D:
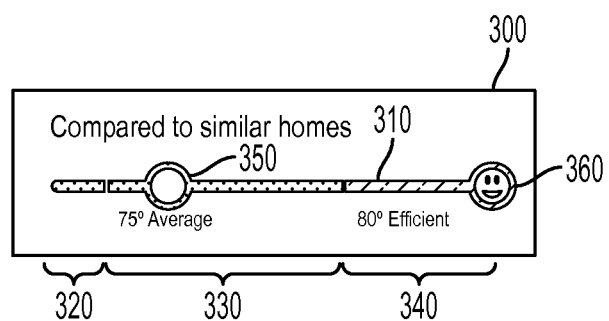

As illustrated in FIG. 3A, the marker 360 may be positioned in segment 320 on the energy efficiency continuum 310 and display an unhappy face when a thermostat user selects a below-average-efficiency thermostat set point. As illustrated in FIG. 3B, the marker 360 may be positioned in segment 330 on the energy efficiency continuum 310 and display a blank face when a thermostat user selects an average-efficiency thermostat set point. As illustrated in FIG. 3C, the marker 360 may be positioned in this segment 340 on the energy efficiency continuum 310 and display a happy face when a thermostat user selects an above-average-efficiency thermostat set point. Additionally, according to another embodiment, as illustrated in FIG. 3D, the marker 360 may display an ecstatic smiley face for a significantly-above-average-efficiency thermostat set point.

As illustrated in FIGS. 3A, 3B, 3C, and 3D, an average thermostat set point may be represented by an average thermostat set point marker 350 on the energy efficiency continuum 310 in order to provide additional feedback about the comparative efficiency of the thermostat user's selected set point, as represented on the continuum 310 by marker 360.

FIGS. 4A, 4B, 4C, and 4D illustrate a graphical user interface 400 for selecting a thermostat set point 420 that includes the previously described thermostat set point efficiency visualization 300 that provides a visual representation of the relative efficiency of the selected thermostat set point 420, according to an embodiment. As shown in FIGS. 4A, 4B, 4C, and 4D, the thermostat set point efficiency visualization 300 including the energy efficiency continuum 310 may be displayed on a top portion of the graphical user interface 400, although according to other embodiments it may be displayed in different locations in the graphical user interface 400. A selectable button 470 may be provided that, in response to being selected by a user, causes the set point efficiency visualization 300 to be removed from display on the graphical user interface 400.

Segment 320 on the energy efficiency continuum 310 may represent below-average-efficiency thermostat set points (e.g., cooling set points below 75 degrees). Segment 330 on the energy efficiency continuum may represent average-efficiency thermostat set points (e.g., cooling set points between 75 degrees and 80 degrees). Segment 340 on the energy efficiency continuum 310 may represent above-average-efficiency thermostat set points (e.g., cooling set points above 80 degrees).

Figure 4B:
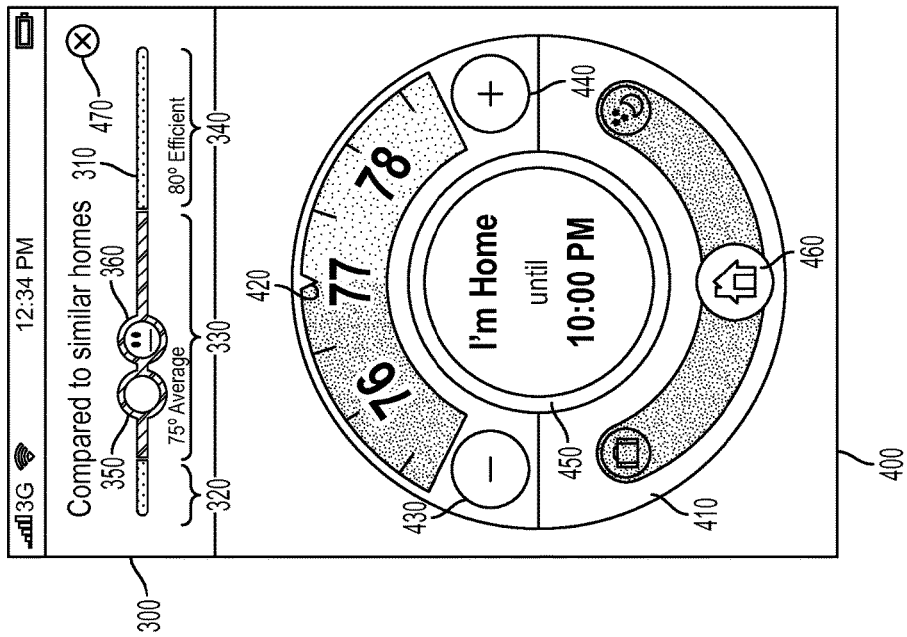
FIGS. 4A, 4B, 4C, and 4D illustrate a graphical user interface for selecting a thermostat set point that provides a visual representation of the relative efficiency of the selected thermostat set point, according to an embodiment.
Figure 4A:
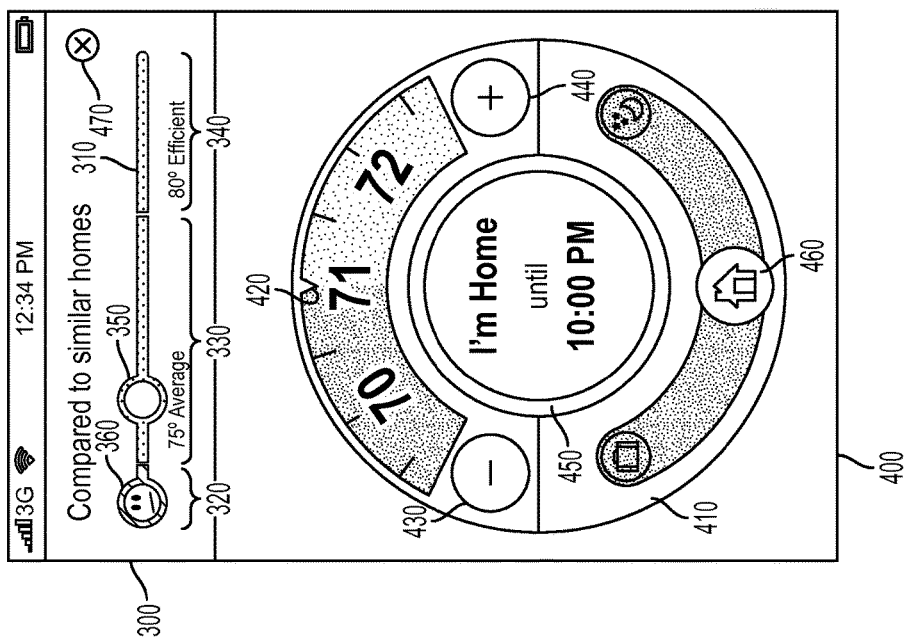
Figure 4C:
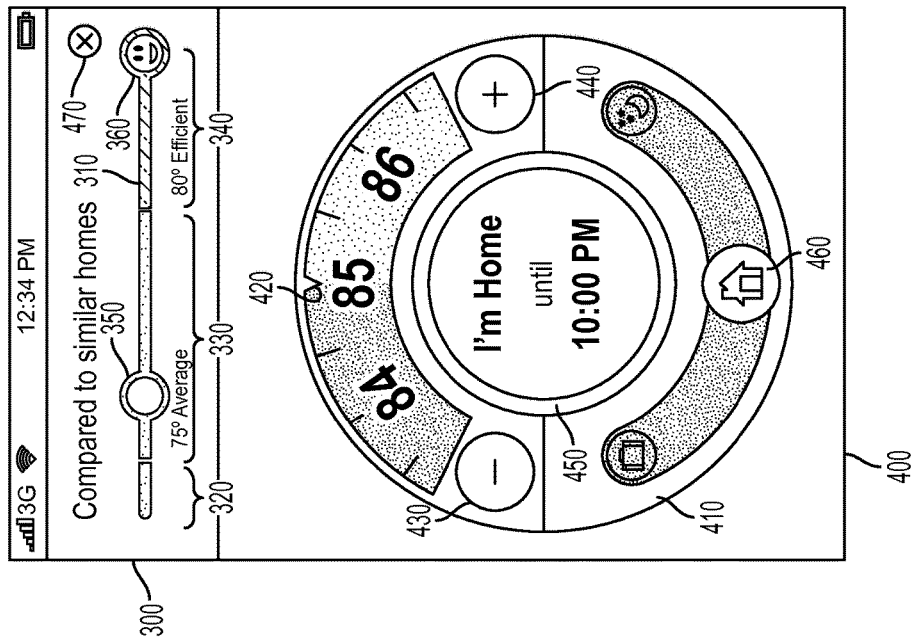

As illustrated in FIG. 4A, the marker 360 may be positioned in segment 320 on the energy efficiency continuum 310 and display an unhappy face when a thermostat user selects a below-average-efficiency thermostat set point. As illustrated in FIG. 4B, the marker 360 may be positioned in segment 330 on the energy efficiency continuum 310 and display a blank face when a thermostat user selects an average-efficiency thermostat set point. As illustrated in FIG. 4C, the marker 360 may be positioned in this segment 340 on the energy efficiency continuum 310 and display a happy face when a thermostat user selects an above-average-efficiency thermostat set point. Additionally, according to another embodiment, as illustrated in FIG. 4D, the marker 360 may display an ecstatic smiley face for a significantly-above-average-efficiency thermostat set point.

As illustrated in FIGS. 4A, 4B, 4C, and 4D, an average thermostat set point may be represented by an average thermostat set point marker 350 on the energy efficiency continuum 310 in order to provide additional feedback about the comparative efficiency of the thermostat user's selected set point, as represented on the continuum 310 by marker 360.

Figure 4D:
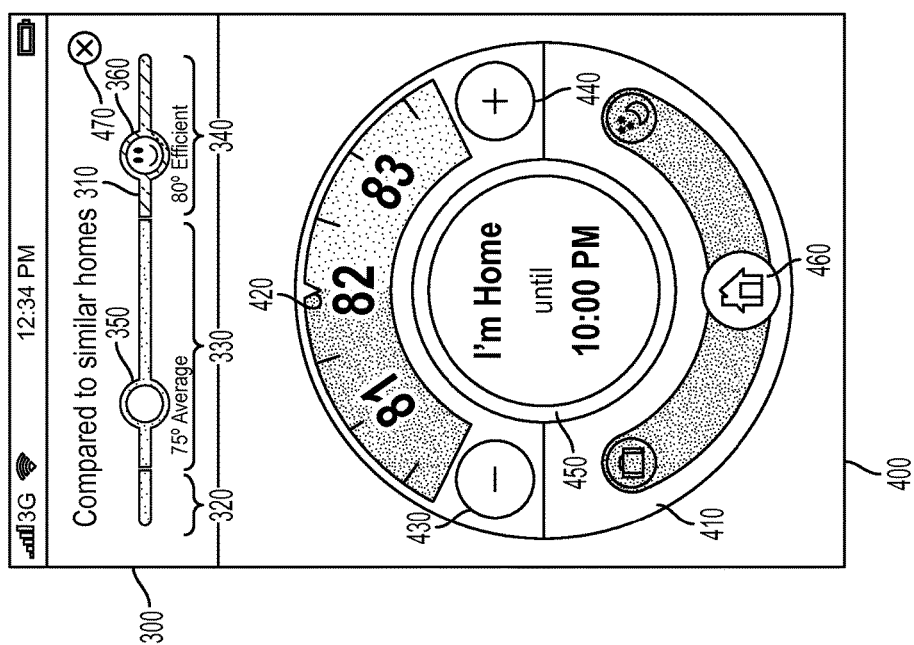

The graphical user interface 400 illustrated in FIGS. 4A, 4B, 4C, and 4D may include a thermostat interface 410 that displays the current thermostat set point temperature 420 (e.g., "71" in FIG. 4A, "77" in FIG. 4B, "82" in FIG. 4C, and "85" in FIG. 4D). Additionally, a "−" button 430 that is selectable by a thermostat user to decrease the thermostat set point temperature and a "+" button 440 that is selectable by a thermostat user to increase the thermostat set point temperature may be provided. The thermostat set point temperatures may be used to control the thermostat user's HVAC system to heat and/or cool to the selected temperatures. A current schedule 450 of the thermostat user may be displayed. For example, in order to save energy, the thermostat may be programmed to keep the house at an optimal temperature only when the thermostat user is scheduled to be home (e.g., before 10:00 p.m.). One or more icons 460 may also be displayed to indicate the current schedule period and other schedule periods (e.g., "home," "away," "sleep," etc.).

In response to a thermostat user updating the thermostat set point temperature, the thermostat set point efficiency visualization 300 may be updated to provide feedback to the thermostat user regarding the relative efficiency of the updated thermostat set point. Specifically, the marker 360 may be repositioned on the continuum 310 to a location on segment 320 to indicate a below-average-efficiency updated thermostat set point. The marker 360 may be repositioned on the continuum 310 to a location on segment 330 to indicate an average-efficiency updated thermostat set point. The marker 360 may be repositioned on the continuum 310 to a location on segment 340 to indicate an above-average-efficiency updated thermostat set point. The position of the marker within segment 320, within segment 330, or within segment 340 may vary depending on the degree to which the efficiency of the updated thermostat set point is below or above average. For example, an updated thermostat set point having significantly above-average efficiency may be positioned at or near the extreme end of the continuum 310, at or near the rightmost portion of segment 340.

The marker 360 may also be changed to display an unhappy face if the updated thermostat set point is a below-average-efficiency thermostat set point, a blank face if the updated thermostat set point is an average-efficiency thermostat set point, or a smiley face if the updated set point is an above-average-efficiency thermostat set point.

According to an embodiment, the updates to the set point efficiency visualization 300 may occur simultaneously with or substantially simultaneously with the updating of the thermostat set point. Alternatively, the updates to the set point efficiency visualization 300 may occur after a predetermined delay period has elapsed (e.g., to allow the thermostat user time to set an intended thermostat set point temperature, without updating as the thermostat user passes through intermediate temperatures).

According to another embodiment, the thermostat user may be able to drag or otherwise move the marker 360 along the continuum 310 to select a desired efficiency level. For example, if the marker 360 is positioned on segment 330 of the continuum 310 based on a current thermostat set point temperature 420 that is in the average-efficiency thermostat set point range, the user may drag the marker 360 into the segment 340 of the continuum 310 to select an above-average-efficiency thermostat set point temperature 420. In response to the marker 360 being moved along the continuum 310, the current thermostat set point temperature 420 is updated to correspond with the new position of the marker 360 on the continuum 310.

Figure 5B:
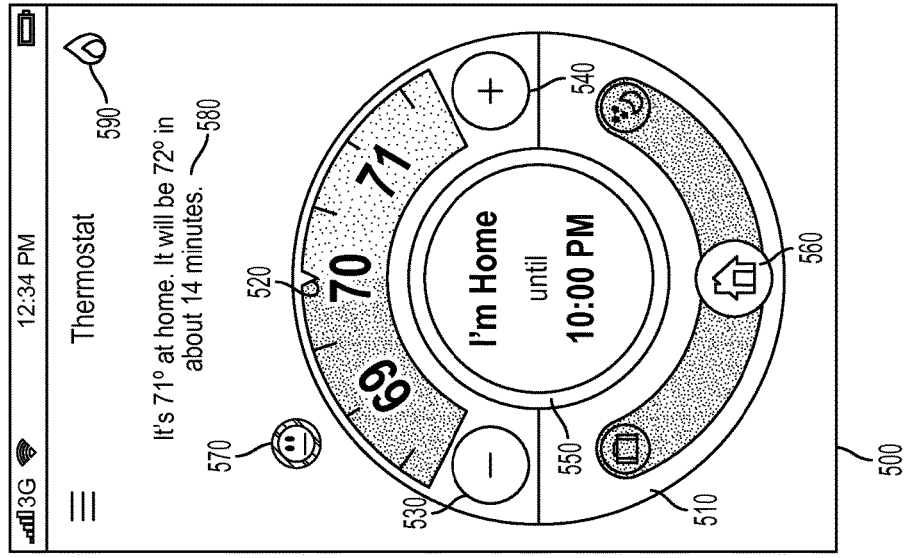
FIGS. 5A, 5B, and 5C illustrate a graphical user interface for selecting a thermostat set point that provides a visual representation of the relative efficiency of the selected thermostat set point, according to another embodiment.
Figure 5A:
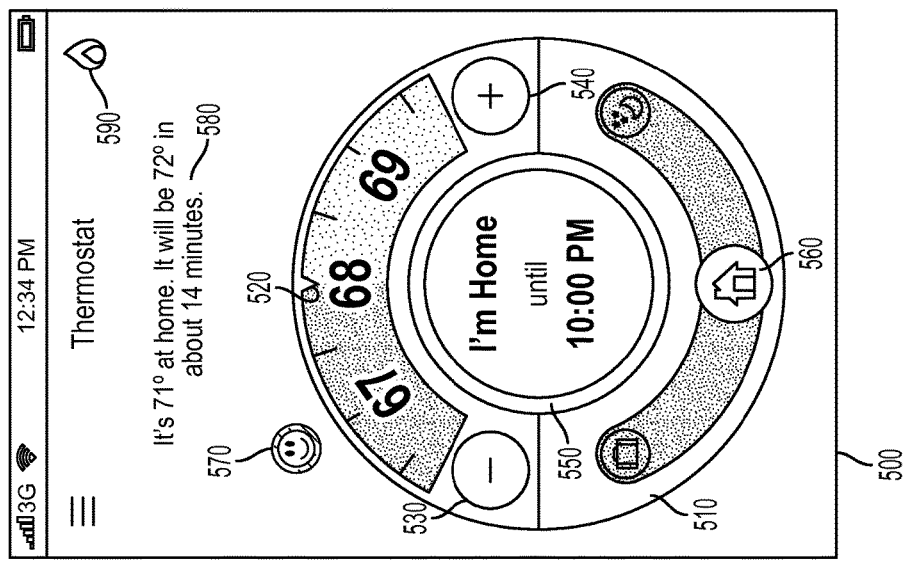
Figure 5C:
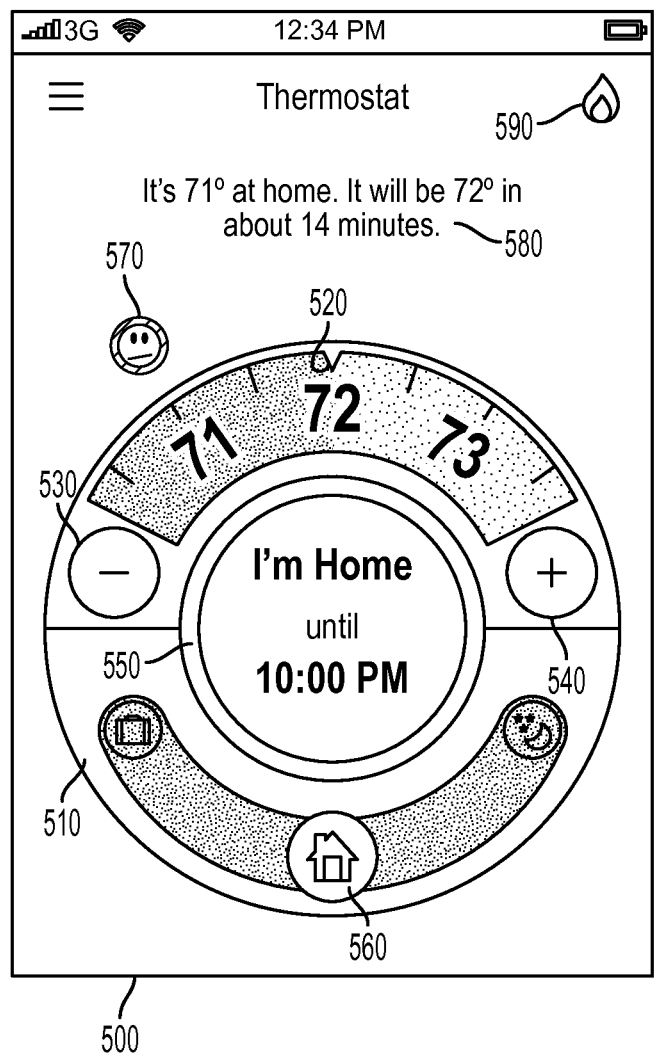

FIGS. 5A, 5B, and 5C illustrate a graphical user interface 500 for selecting a thermostat set point 520 that provides a thermostat set point efficiency visualization 570, according to another embodiment. As shown in FIGS. 5A, 5B, and 5C, the thermostat set point efficiency visualization 570 may only include an icon representing an unhappy face as shown in FIG. 5A, a blank face as shown in FIG. 5B, or a smiley face as shown in FIG. 5C, depending on the relative efficiency of the selected thermostat set point.

The graphical user interface 500 illustrated in FIGS. 5A, 5B, and 5C may include a thermostat interface 510 that displays the current thermostat set point temperature 520 (e.g., "68" in FIG. 5A, "70" in FIG. 5B, and "72" in FIG. 5C). Additionally, a "−" button 530 that is selectable by a thermostat user to decrease the thermostat set point temperature and a "+" button 540 that is selectable by a thermostat user to increase the thermostat set point temperature may be provided. The thermostat set point temperatures may be used to control the thermostat user's HVAC system to heat and/or cool to the selected temperatures. A current schedule 550 of the thermostat user may be displayed. For example, in order to save energy, the thermostat may be programmed to keep the house at an optimal temperature only when the thermostat user is scheduled to be home (e.g., before 10:00 p.m.). One or more icons 560 may also be displayed to indicate the current schedule period and other schedule periods (e.g., "home," "away," "sleep," etc.).

In response to a thermostat user updating the thermostat set point temperature, the thermostat set point efficiency visualization 570 may be updated to provide feedback to the thermostat user regarding the relative efficiency of the updated thermostat set point. Specifically, the set point efficiency visualization 570 may be changed to display an unhappy face if the updated thermostat set point is a below-average-efficiency thermostat set point (as shown in FIG. 5C), a blank face if the updated thermostat set point is an average-efficiency thermostat set point (as shown in FIG.

5B), or a smiley face if the updated thermostat set point is an above-average-efficiency thermostat set point (as shown in FIG. 5A).

According to an embodiment, the updates to the thermostat set point efficiency visualization 570 may occur simultaneously with or substantially simultaneously with the updating of the thermostat set point. Alternatively, the updates to the thermostat set point efficiency visualization 570 may occur after a predetermined delay period has elapsed (e.g., to allow the thermostat user time to set an intended thermostat set point temperature, without updating as the thermostat user passes through intermediate temperatures).

As discussed above with respect to FIGS. 3A, 3B, 3C, 3D, 4A, 4B, 4C, and 4D, the continuum 310 may be divided into segment 320 representing below-average-efficiency thermostat set points, segment 330 representing average-efficiency thermostat set points, and segment 340 representing above-average efficiency thermostat set points. The continuum 310 may represent the range of thermostat set point temperatures of a plurality of network connected thermostats. The segments 320, 330, 340 on the continuum may be color coded. For example, segment 320 may be displayed in a red color to represent below-average-efficiency thermostat set points. Segment 330 may be displayed in a gray color to represent average-efficiency thermostat set points. Segment 340 may be displayed in a green color to represent above-average-efficiency thermostat set points.

According to an embodiment, the length of the continuum 310 and the segments 320, 330, 340 may be predefined and may remain constant. The segments 320, 330, 340 may be of unequal length. According to an embodiment, segment 320 (representing below-average-efficiency thermostat set points) may be the shortest of segments 320, 330, 340 and segment 330 (representing average-efficiency thermostat set points) may be the longest of segments 320, 330, 340.

According to an embodiment, the below-average-efficiency thermostat set point range represented by segment 320 may be made up of two index thermostat set points (referred to as BA and BA1) below the median thermostat set point (referred to as M). The index thermostat set points may differ depending on whether the thermostat is set to a heating or cooling mode. According to an embodiment, the index thermostat set points may be determined as follows:

Heating Mode
1. BA=M+1
2. BA1≥M+2
Cooling Mode
1. BA=M−1
2. BA1≤M−2

According to an embodiment, the average-efficiency thermostat set point range represented by segment 330 may be made up of the difference between M and the starting temperature in the above-average-efficiency thermostat set point range (referred to as E). According to an embodiment, the above-average-efficiency thermostat set point range may be defined as the top 20% of thermostat users (i.e., either the hottest cooling mode thermostat set points or coldest heating mode thermostat set points). A different threshold may also be used.

The average-efficiency thermostat set point range may differ from the above-average-efficiency thermostat set point range and below-average-efficiency thermostat set point range because the number of index thermostat set points in the average-efficiency thermostat set point range fluctuates. For example, if the difference between M and E is 10, then there are 10 index thermostat set points a thermostat user must move between before the thermostat user enters the above-average-efficiency thermostat set point range. However, if the difference between M and E is 8, then there are only 8 index thermostat set points the thermostat user must move between to enter the above-average-efficiency thermostat set point range.

Finally, according to an embodiment, the above-average-efficiency thermostat set point range may be made up of five index thermostat set points (E through E4). The above-average-efficiency thermostat set point range may be defined as either the cooling mode thermostat set points that are in the hottest 20% of all thermostat users, or the heating mode thermostat set points that are in the coldest 20% of all thermostat users. The first index thermostat set point in the range is referred to as E, as discussed above. Different thresholds may also be used. According to an embodiment, the index thermostat set points may be determined as follows:

Heating Mode:
1. E=Start of top 20% range
2. E1=E−1
3. E2=E−2
4. E3=E−3
5. E4≤E−4
Cooling Mode
1. E=Start of top 20% range
2. E1=E+1
3. E2=E+2
4. E3=E+3
5. E4≥E+4

Alternatively, according to another embodiment, the below-average-efficiency thermostat set point range, the above-average-efficiency thermostat set point range, and the average-efficiency thermostat set point range may be defined as the least efficient x percent of thermostat set points, the most efficient y percent of thermostat set points, and the remaining thermostat set points, respectively. For example, the below-average efficiency thermostat set point range may be determined using the least efficient 15% of thermostat set points, the above-average efficiency set point range may be determined using the most efficient 20% of thermostat set points, and the average-efficiency set point range may be determined using the remaining 65% of thermostat set points.

Figure 6:
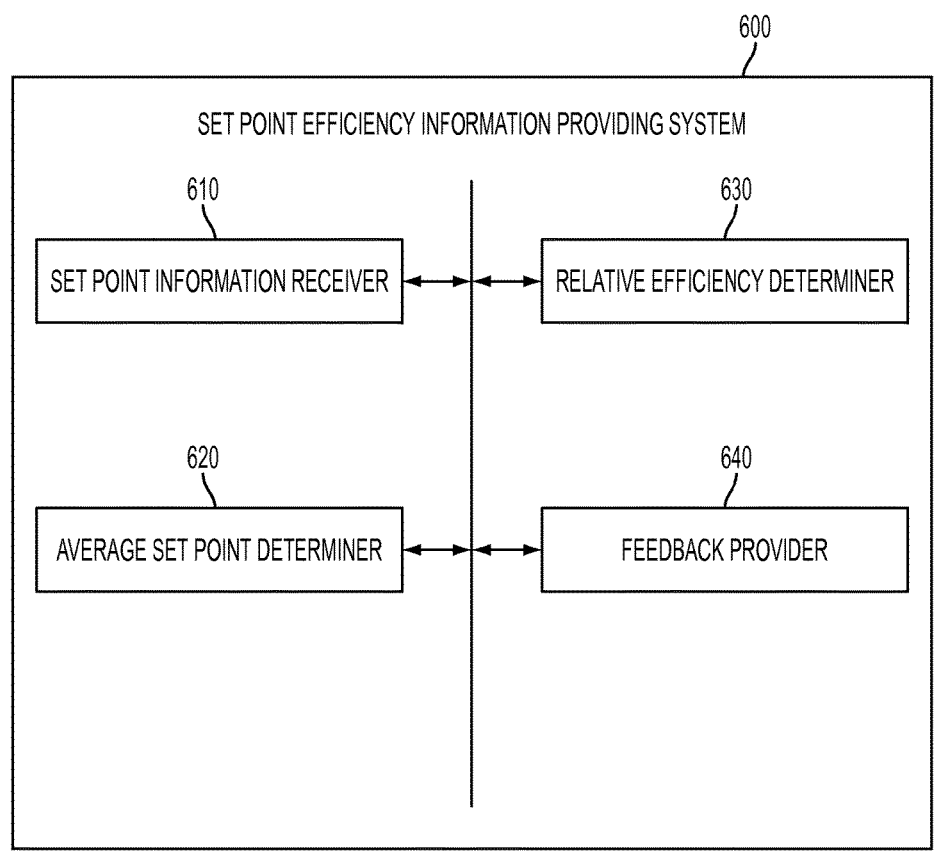
FIG. 6 is a block diagram illustrating a thermostat set point efficiency information providing system, according to an embodiment.

FIG. 6 is a block diagram illustrating a thermostat set point efficiency information providing system 600, according to an embodiment. The system 600 may include a set point information receiver 610 that receives an individual thermostat set point for a thermostat user and thermostat set point information for a plurality of users, an average set point determiner 620 that determines an average thermostat set point using the thermostat set point information received by the set point information receiver 610, a relative efficiency determiner 630 that determines the relative efficiency of the individual thermostat set point using the average thermostat set point determined by the average set point determiner 620, and a feedback provider 640 that provides feedback that is displayed on a display regarding the relative efficiency of the individual thermostat set point determined by the relative efficiency determiner 630.

Figure 7:
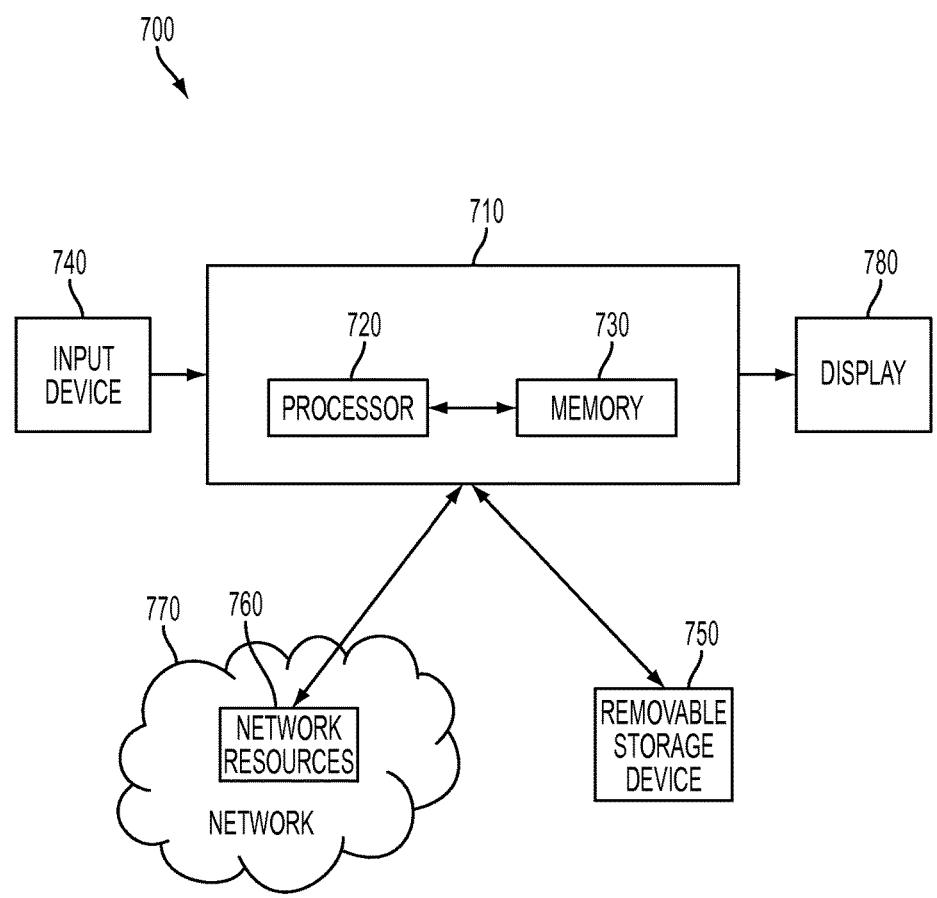
FIG. 7 is a block diagram illustrating a computer system upon which the thermostat set point efficiency information providing system may be implemented, according to an embodiment.

FIG. 7 is a block diagram that illustrates an embodiment of a computer/server system 700 upon which an embodiment may be implemented. The system 700 includes a computer/server platform 710 including a processor 720 and memory 730 which operate to execute instructions, as known to one of skill in the art. The term "computer-readable storage medium" as used herein refers to any tangible medium, such as a disk or semiconductor memory, that participates in providing instructions to processor 720 for execution. Additionally, the computer platform 710 receives input from a plurality of input devices 740, such as a keyboard, mouse, touch device, touchscreen, or microphone. The computer platform 710 may additionally be connected to a removable storage device 750, such as a portable hard drive, optical media (CD or DVD), disk media, or any other tangible medium from which a computer can read executable code. The computer platform 710 may further be connected to network resources 760 which connect to the Internet or other components of a local public or private network. The network resources 760 may provide instructions and data to the computer platform 710 from a remote location on a network 770. The connections to the network resources 760 may be via wireless protocols, such as the 802.11 standards, Bluetooth® or cellular protocols, or via physical transmission media, such as cables or fiber optics. The network resources may include storage devices for storing data and executable instructions at a location separate from the computer platform 710. The computer platform 710 interacts with a display 780 to output data and other information to a thermostat user, utility customer, tenant, or other user, as well as to request additional instructions and input from the thermostat user, utility customer, tenant, or other user. The display 780 may be a touchscreen display and may act as an input device 740 for interacting with a thermostat user, utility customer, tenant, or other user.

Figure 8:
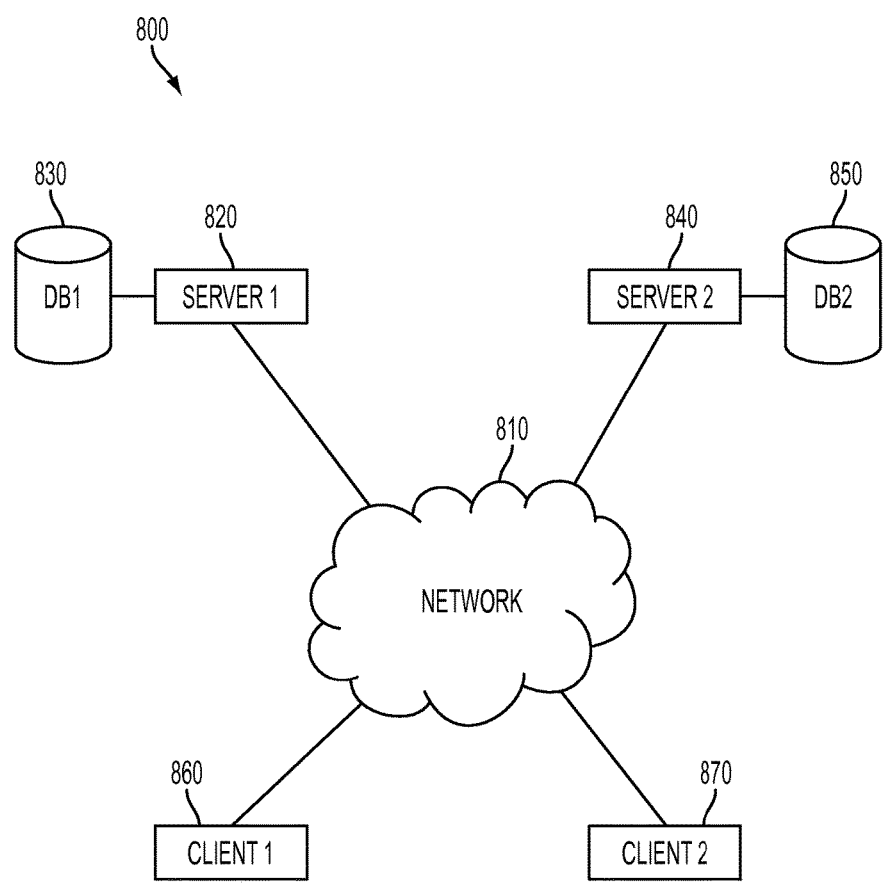
FIG. 8 is a block diagram that illustrates an embodiment of a network including servers upon which the thermostat set point efficiency information providing system may be implemented and client devices that communicate with the servers.

FIG. 8 is a block diagram that illustrates an embodiment of a network 800 including servers 820, 840 upon which the system may be implemented and client devices 860, 870 that communicate with the servers 820, 840. The client devices 860, 870 may be thermostats, computers, smartphones, or mobile devices and may communicate across the Internet or another wide area network (WAN) or local area network (LAN) 810 with server 1 820 and server 2 840. Server 1 820 communicates with database 1 830, and server 2 840 communicates with database 2 850. According to an embodiment, one or both of server 1 820 and server 2 840 may implement a thermostat set point comparison providing system. Client device 1 860 and/or client device 2 870 may interface with the thermostat set point comparison providing system and request server 1 820 and/or server 2 840 to perform processing to compare thermostat set points. Server 1 820 may communicate with or otherwise receive information from database 1 830 or another internal or external data source or database in the process of providing thermostat set point comparisons at the request of a client device, and server 2 840 may communicate with database 2 850 or another internal or external data source or database in the process of providing thermostat set point comparisons at the request of a client device.

Various embodiments described herein refer to energy use, energy conservation, and/or energy in general. In various embodiments, energy may refer to electricity, gas, coal, heating oil, fuel, or any other medium capable of storing energy.

The foregoing detailed description has set forth various embodiments via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, or virtually any combination thereof, including software running on a general purpose computer or in the form of a specialized hardware.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A method for providing information about a relative efficiency of an individual set point, the method comprising:
   receiving set point information for a plurality of users;
   determining, using a processor, an average set point using the received set point information;
   receiving the individual set point that is associated with a selected user;
   determining, by the processor, the relative efficiency of the received individual set point as compared to the determined average set point; and
   providing, via network communication to a remote device associated with the selected user, feedback that is displayed on a display of the remote device, wherein the feedback includes a marker on a continuum, wherein the continuum is displayed having a first end representing a below average efficiency and a second end representing an above average efficiency, wherein a position of the marker on the continuum is determined using the relative efficiency, wherein displaying the marker visually distinguishes the position from other positions on the continuum.

2. The method of claim 1, wherein the set point information and the individual set point correspond to thermostat heating set points or thermostat cooling set points.

3. The method of claim 1, wherein the display comprises a screen of a mobile device.

4. The method of claim 1, wherein:
   in response to the relative efficiency of the individual set point being below average, the marker comprises a first graphical representation;
   in response to the relative efficiency of the individual set point being average, the market comprises a second graphical representation; and
   in response to the relative efficiency of the individual set point being above average, the marker comprises a third graphical representation.

5. The method of claim 1, wherein:
   in response to the relative efficiency of the individual set point being below average, the marker comprises an unhappy face;
   in response to the relative efficiency of the individual set point being average, the market comprises a blank face; and
   in response to the relative efficiency of the individual set point being above average, the marker comprises a happy face.

6. The method of claim 1, further comprising:
   receiving an updated individual set point;
   determining a relative efficiency of the received updated individual set point as compared to the determined average set point; and
   providing feedback that is displayed on the display regarding the determined relative efficiency of the updated individual set point, wherein the position of the marker on the continuum is updated based on the relative efficiency of the updated individual set point.

7. The method of claim 1, wherein:
the continuum is divided into a below average efficiency segment comprising the first end of the continuum, an average efficiency segment, and an above average efficiency segment comprising the second end of the continuum;
set points that are less energy efficient compared to the average set point are represented on the below average efficiency segment;
set points that are similarly energy efficient compared to the average set point are represented on the average efficiency segment;
set points that are more energy efficient compared to the average set point are represented on the above average efficiency segment; and
the below average efficiency segment, the average efficiency segment, and the above average efficiency segment are each displayed using a unique color.

8. The method of claim 7, wherein the below average efficiency segment is shorter than the average efficiency segment and the above average efficiency segment is longer than the average efficiency segment.

9. The method of claim 1, wherein the continuum is displayed within a graphical user interface in which the individual set point is selected.

10. The method of claim 1, wherein the individual set point is received from an individual user who is a member of a same group as the plurality of users, the same group comprising users selected using at least one of geographic location; building size; heating, ventilation, and air conditioning (HVAC) system power; HVAC system type; thermodynamic properties; outdoor temperature; family demographics; or building specifications.

11. A non-transitory computer readable medium storing executable instructions that when executed by a processor of a computer cause the computer to:
receive, by the processor, thermostat set point information for a plurality of users;
receive, by the processor, at least one thermostat setting for a selected user;
determine, by the processor, an average set point based on the thermostat set point information for the plurality of users;
determine a relative efficiency of the at least one thermostat setting as compared to the determined average set point based on the thermostat set point information for the plurality of users and the at least one thermostat setting for the user; and
provide, via a network communication to a remote device associated with the selected user, the relative efficiency as data and cause a marker on a continuum to be displayed on the remote device, wherein the continuum is caused to be displayed having a first end representing a below average efficiency and a second end representing an above average efficiency, wherein a position of the marker on the continuum is determined using the relative efficiency, wherein displaying the marker visually distinguishes the position from other positions on the continuum.

12. The non-transitory computer readable medium of claim 11, wherein the at least one thermostat setting for the selected user comprises a thermostat set point.

13. The non-transitory computer readable medium of claim 12, wherein the set point insight comprises a normative comparison between the thermostat set point for the selected user and an average set point for the plurality of users, wherein the average set point for the plurality of users is calculated based on the thermostat set point information for the plurality of users.

14. The non-transitory computer readable medium of claim 11, wherein the marker on the continuum is displayed on a screen of the remote device.

15. The non-transitory computer readable medium of claim 11, further comprising identifying the plurality of users that include users with one or more shared attributes with the selected user wherein the shared attributes include at least one of:
a zip code in common with the user;
a neighborhood in common with the user;
family demographics in common with the user;
building characteristics in common with the user;
enrollment in a same utility program as the user; or
a same utility rate plan as the user.

16. A system for providing a set point insight, the system comprising:
a set point information receiver that receives thermostat set point information for a plurality of users and receives an individual set point for a user;
a set point determiner that, using a processor, determines an average set point based on the thermostat set point information for the plurality of users received by the set point information receiver, and determines a relative efficiency of the individual set point as compared to the determined average set point; and
a feedback provider that provides, to the user via a network communication, the relative efficiency as data and causes a display, on a continuum displayed having a first end representing a below average efficiency and a second end representing an above average efficiency, of at least one of (i) a first marker representing the average set point for the plurality of users or (ii) a second marker representing a set point selected by the user, wherein the display of at least one of the first marker or the second marker visually distinguishes a position on the continuum from other positions on the continuum.

17. The system of claim 16, wherein the thermostat set point information received by the set point information receiver comprises thermostat heating set points or thermostat cooling set points.

18. The system of claim 17, wherein the average set point identified by the set point insight identifier comprises an average thermostat heating set point or an average thermostat cooling set point for the plurality of users.

19. The system of claim 17, wherein:
the first marker and the second marker are concurrently displayed on the continuum.

20. The system of claim 17, wherein:
the second marker that is displayed is configured to be movable on the continuum by the user; and
in response to the second marker being moved on the continuum by the user, the set point selected is updated.

* * * * *